HIGH POWER PULSE TIME MODULATION COMMUNICATION SYSTEM
WITH EXPLOSIVE POWER AMPLIFICATION MEANS

Filed March 2, 1964 3 Sheets-Sheet 1

INVENTOR.
ROBERT L. FORWARD,
BY
Walter J. Adam
ATTORNEY.

June 25, 1968 R. L. FORWARD 3,390,334

HIGH POWER PULSE TIME MODULATION COMMUNICATION SYSTEM
WITH EXPLOSIVE POWER AMPLIFICATION MEANS

Filed March 2, 1964 3 Sheets-Sheet 2

INVENTOR.
ROBERT L. FORWARD,
BY
Walter J. Adam
ATTORNEY

INVENTOR.
ROBERT L. FORWARD,
BY
Walter J. Adam
ATTORNEY.

United States Patent Office 3,390,334

Patented June 25, 1968

3,390,334

HIGH POWER PULSE TIME MODULATION COMMUNICATION SYSTEM WITH EXPLOSIVE POWER AMPLIFICATION MEANS

Robert L. Forward, Oxnard, Calif., assignor to Hughes Aircraft Company, Culver City, Calif., a corporation of Delaware Filed Mar. 2, 1964, Ser. No. 348,631
9 Claims. (Cl. 325—43)

ABSTRACT OF THE DISCLOSURE

A transmitter is shown, including a binary counter and a first and second pulse forming device, each pulse forming device including an explosive element and a compressible piezoelectric crystal for developing a high power and relatively narrow pulse. At the start of a message, a first pulse is transmitted from the first pulse forming device and clock pulses are gated to the counter. When the counter changes to a count representative of a coded message, a second pulse is transmitted from the second pulse forming device. A binary counter is provided at the receiver responsive to a clock source similar to that at the transmitter to count between the first and second intercepted pulses to develop a binary number representative of the coded message.

This invention relates to communication systems and particularly to a simplified and improved transmitting and receiving system for conveying binary information at power levels suitable for long distance communication.

Binary data is conventionally conveyed through space from a radio transmitter requiring a plurality of components and a relatively heavy and complex power supply. When transmitting over long distances such as from a high altitude rocket to an air vehicle or to the ground or from a space probe vehicle to earth, the power over weight ratio of the transmitting arrangement is an important factor. Pulse position modulation systems which utilize a code that is dependent upon counting the period of time between pulses have been considered for transmitting a limited amount of binary information but conventionally have the disadvantage that because of the limited available transmitting power, narrow band receivers are required in order to obtain a relatively high signal to noise ratio. This narrow band filtering requirement thus limits the rise time of the transmitted and received pulses to a time approximately equal to the reciprocal of the bandwidth which decreases the information transmitting capacity of a pulse position code system. A typical conventional pulse position system for planetary landing systems utilizes a relatively small hundred milliwatt transmitter operating at a frequency of one hundred megacycles per second and having a pulse rise time of approximately 0.05 second which matches the receiver bandwidth of approximately 20 cycles per second. The pulses of the system have an excursion of 0.5 second which substantially limits the numbers of bits that may be transmitted between pulses at any frequency at which a clock is counting at the transmitter and rceiver.

It is therefore an object of this invention to provide a system that transmits moderate amounts of binary data with a relatively small, lightweight and reliable device.

It is a further object of this invention to provide a communication system that has a relatively high power over weight ratio.

It is a still further object of this invention to provide a transmitting system that develops a relatively high power informational pulse with a minimum of complexity and weight.

It is another object of this invention to provide an improved transmitting and receiving system that operates without the requirement of frequency conversion components or impedance matching networks.

It is still another object of this invention to provide a pulse position modulation system in which a relatively large number of binary bits may be transmitted in a relatively short time.

Briefly, the system in accordance with the principles of the invention includes a transmitter having a source of periodic or clock pulses which are applied through a gate to a binary counter. An initiating circuit controls the gate to apply clock pulses to the counter and trigger an explosive in a pulse forming device which applies a first pulse directly to a wideband transmitting antenna. The binary counter is coupled to a different pulse forming device to apply a second pulse to the antenna in response to a predetermined count. The pulse forming devices utilize the principle that an explosive shock applied to a piezoelectric or a ferrite element develops a high power and narrow pulse when coupled to the low impedance of the wideband antenna. The receiver includes a similar source of clock pulses which are applied through a gate to a counter arrangement. The gate at the receiver is controlled by the first pulse triggering a bistable device to a first state to apply the clock pulses to the counter arrangement and by the second pulse triggering the bistable device to a second state to terminate the counting operation, the received message being indicated by the final state of the counter. The system of the invention may include additional counters and pulse forming devices at the transmitter and additional counters at the receiver to transmit a plurality of serial messages with each additional message being defined by a single pulse.

The novel features of this invention as well as the invention itself, both as to its organization and method of operation, will best be understood from the accompanying description, taken in connection with the accompanying drawings, in which like characters refer to like parts, and in which.

Figure 1:
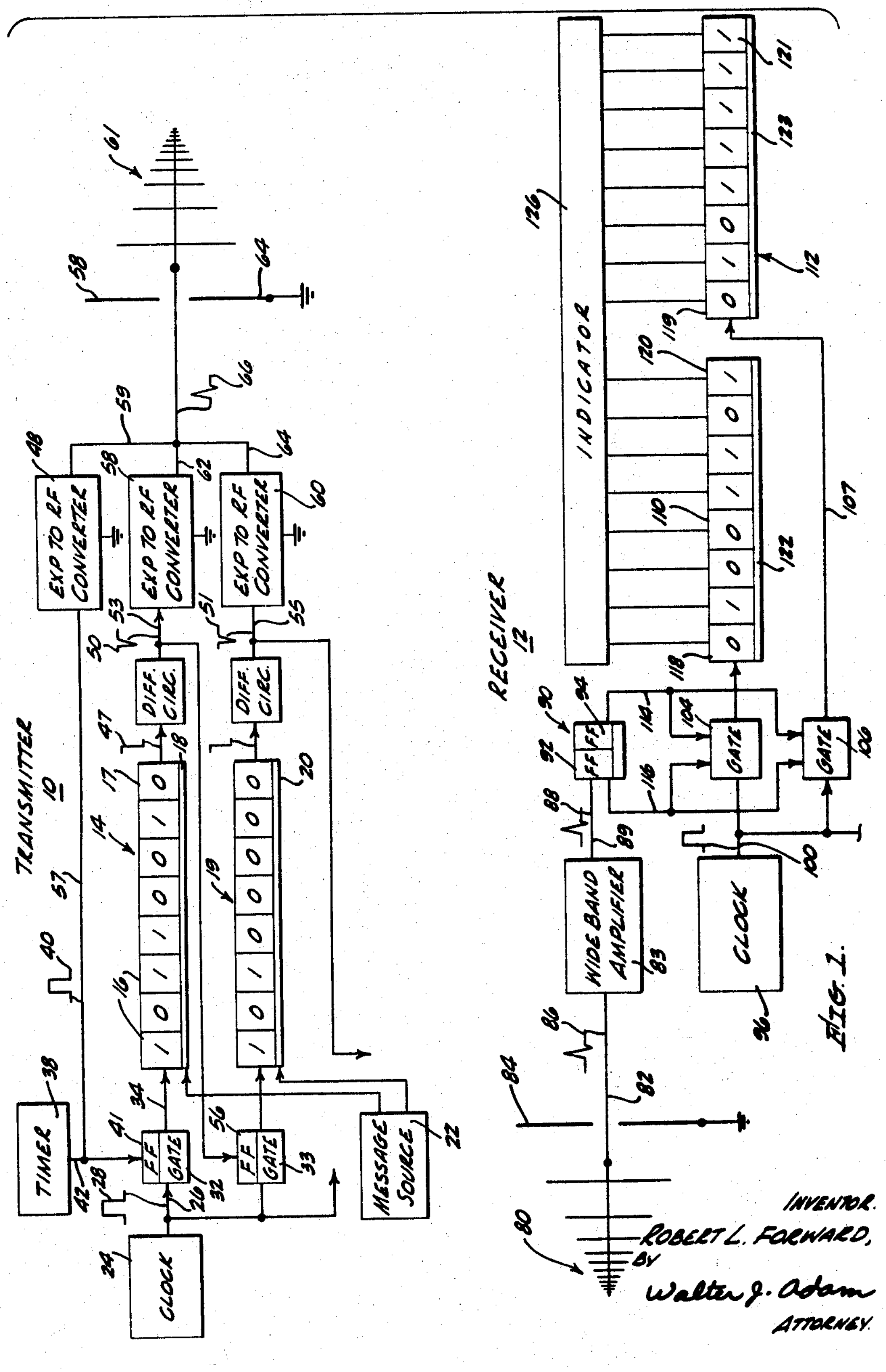
FIG. 1 is a schematic block diagram of the transmitting and receiving system in accordance with the principles of the invention.

Referring first to FIG. 1 which shows a transmitter 10 and a receiver 12, a binary number representative of a first message to be transmitted, may be recorded in a flip flop counter 14 which includes a plurality of flip flops such as 16 and 17 and suitable counter logical circuits 18 as are well known in the art. The flip flop 16 may store the least significant bit and flip flop 17 may store the most significant bit of the binary number contained therein. A second message may be stored in a binary counter circuit 19 which circuit may be similar to the binary counter 14 and include logical circuits 20. A source of message information 22 is coupled to the counters 14 and 19 for initially inserting the complements of binary numbers that are to be transmitted and that represent words of information. The source 22 may be a manually controlled circuit for triggering each of the flip flops to a selected binary state. The counter 14 is shown including a binary number 01001101 from the most significant to the least significant end, which number is a complement of the binary number 10110010 representing the message to be transmitted. Also, the counter 19 is shown including a binary number 00000101 which is the complement of the message to be transmitted. A suitable source of clock pulses such as a crystal clock 24 is coupled through a lead 26 for applying pulses of a waveform 28 to a gate circuit 32 which in turn is coupled through a lead 34 to the flip flop counter 14. The clock 24 may either develop rectified and square pulses of the waveform 28 or sine waves, which types of clock circuits are well known in the art. The lead 26 is also coupled to a gate circuit 33 as well as to other gating circuits (not shown) when additional messages are to be transmitted. The gating circuit 33 is coupled to the counter 19. A source of timing or initiating pulses 38 applies timing pulses of a waveform 40 through a lead 42 to a flip flop 41 which responds to be triggered to a state so as to close the gate 32. Conventional "and" gates, for example, may be utilized for the gates 32 and 33.

Differentiating circuits 43 and 45 are coupled to the most significant flip flop of the respective counters 14 and 19 and respond to the most significant flip flops such as 17 being triggered to the "zero" state after the counter has been triggered to a series of "ones" to apply pulses of waveforms 47 and 49 thereto. The circuits 43 and 45 respond to apply negative differentiated pulses of respective waveforms 50 and 51 to leads 53 and 55. A flip flop 56 is coupled to the lead 53 for responding to the pulse of the waveform 50 to bias the gate 33 to the closed condition at the start of the transmitting period representing the second informational number. Similarly, the lead 55 may be coupled to a flip flop (not shown) of a subsequent stage for transmitting a third binary number.

The timing pulse of the waveform 40 is also applied through a lead 57 to an energy to narrow pulse onverter 48 which in turn is coupled through a lead 59 to a wideband low impedance antenna system 61. As will be explained subsequently, the energy to narrow pulse converter 48 includes an explosive material which responds to the pulse of the waveform 40 to crush an element such as a piezoelectric crystal to destruction for forming a high power narrow pulse of a waveform 66. Also, in some arrangements in accordance with the invention, the converter 48 may include other materials to be crushed such as ferrite materials. The antenna 61 may be any suitable wideband and frequency independent antenna, a log periodic dipole array being shown adjacent to a ground plane 58. The log periodic dipole array is well known in the art as discussed in an article by D. E. Isbell, "Log-Period Dipole Arrays," in the IRE Transactions AP-8, May 1960, on pages 260 to 267. Other well known types of wideband antenna that may be utilized in accordance with the invention are logarithmic spiral slot antennas, balanced conical logarithmic spiral antennas and log-periodic resonant-V arrays as discussed in an article, "A Survey of the Very Wide Band and Frequency Independent Antennas—1945 to the Present," by John D. Dyson in the Journal of Research of the National Bureau of Standards, Radio Propagation, vol. 66D, No. 1, January, February 1962. Energy to pulse converters 58 and 60 are also provided respectively coupled between the lead 53 and a lead 62 and between the lead 55 and a lead 64. High power pulses of the waveform 66 are applied to the antenna 61 through the leads 59, 62 or 64 which may be coaxial lines, for example.

Thus, a first pulse of the waveform 66 is transmitted in response to the timer 38, and a coded binary number of information is transmitted in response to each of the converters 58 and 60 being fired at times representative of the message. It is to be noted that although for convenience of illustration, each of the counters 14 and 19 are shown including 8 flip flops, the system of the invention will transmit a binary informational number of many more bits as will be explained subsequently.

The receiver 12 includes a wideband antenna 80 coupled through a lead 82 to a wideband amplifier 83 for amplifying the received signal of a waveform 86 to the signal of a waveform 88 which in turn is applied to a lead 89. The wideband antenna 80 which may include a ground plane 84 may be similar to the transmitting antenna 61. The lead 82 may be a conventional conductor or coaxial cable in some arrangements, and the amplifier 83 may be a conventional type as is well known in the art. The amplified signal of the waveform 88 is applied to a control counter 90 which may include flip flops 92 and 94. A source of timing or clock pulses such as crystal clock 96 is provided to operate at substantially the same rate as the crystal clock 24 to apply pulses of a waveform 98 through a lead 100 to gating circuits or gates 104 and 106. Pulses are applied through leads 105 and 107 from the respective gates 104 and 106 to binary counter circuits 110 and 112 which may be similar to the counters 14 and 19 at the transmitter 10. The counters 110 and 112 respectively develop the first and second received information signals and other gates and counters (not shown) may be provided for receiving additional transmitted numbers. When the flip flops 94 and 92 are in first 00 states, negative pulses may be applied through leads 114 and 116 to the gates 104 and 106 to maintain both gates closed. When the flip flops 94 and 92 are in the 01 state, the gate 104 is opened so that clock pulses of the waveform 98 are applied to a lead 105. Thus, the gates 104 and 106 may be conventional "and" gates responsive to the states of the counter 90. When the flip flops 104 and 102 are in the 10 states the gate 104 is closed and the gate 106 is opened. In the fourth state of the counter the flip flops 94 and 92 are in the 11 states and both gates 104 and 106 are closed. When additional gates are utilized, the control counter 90 may include additional flip flops and suitable diode logical selection gates as are well known in the computer art.

Thus, in response to the first high power pulse intercepted by the antenna 80, the clock pulses of the waveform 98 are applied through the lead 105 to the flip flop counter 110 until a second pulse intercepted by the antenna triggers the flip-flops 92 and 94 to the states to close and open the respective gates 104 and 106. The pulses of the waveform 98 are thus applied to the counter 112 until a third pulse of the waveform 88 triggers the counter 90 to the "11" state and the gate 106 is closed. The flip flop counters 110 and 112 respectively include flip flops 118 and 120 and flip flops 119 and 121 of the least significant and most significant positions therein and include conventional logical control circuits 122 and 123 as are well known in the art. Conventional arrangements (not shown) may be provided to initially reset the counters 112 and 110 to the zero states. The complement of the numbers inserted in the flip flop counters 14 and 19 are thus developed in the respective flip flop counters 110 and 112 shown as 10110010 and 11111010 from the most significant to the least significant bits. The binary numbers developed in the flip flop counters 110 and 112 may be displayed in a conventional binary indicator 126 which, for example, may include lights that will be illuminated for a "one" or remain in the non-illuminated state for a "zero."

Figure 2:
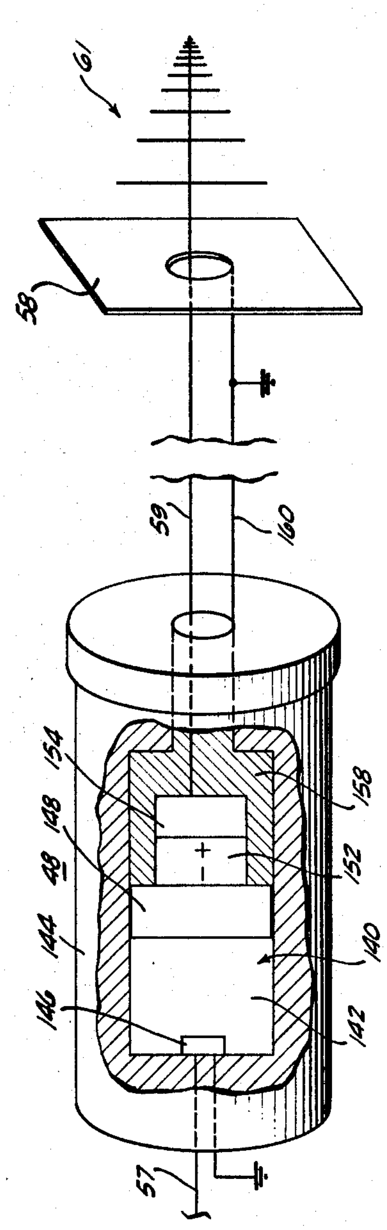
FIG. 2 is a schematic block diagram of the high power explosive material to pulse converter utilized in the system of FIG. 1 and including a piezoelectric or ferrite element in accordance with the principles of the invention.

Referring now to FIG. 2 an arrangement is shown that may be utilized for the converter 48 and that is similar to the converters 58 and 60. The converter 48 includes a high explosive plane wave generator 140 including a mass of explosive material 142 enclosed in a cylinder 144 and having a suitable igniting arrangement such as an explosive igniter cap 146. A first terminal of the cap 146 may be coupled to ground and a second terminal thereof coupled to the lead 57 (or 53 and 55 for the converters 58 and 60). The explosive material may be any high energy content explosive as is well known in the art such as nitro-guanadene powder, PBX explosive or TNT. The explosive shock is applied to a driver electrode 148 which may be of a steel material for example, and movable within the cylinder 144. The movement of the driver electrode 148 applies a shock wave to an element 152 which may be synthetic or natural quartz, for example, or in some arrangements in accordance with the invention may be a ferrite material. The element 152 may be initially positioned in close contact with the driver electrode 148. At the opposite side of the element 152 is a stationary output electrode 154 against which the quartz element 152 is compressed or broken to destruction. The output electrode 144 which may be formed of steel is mounted in a mass of hardened epoxy material 158 to provide electrical isolation from the grounded cylinder 144 and the driver electrode 148. The element 152 may also be mounted in the epoxy material 158. The end of the cylinder 144 adjacent to the epoxy material 158 may be threaded onto the body of the cylinder, for example, for assembling the device. The output electrode 154 is coupled to the lead 59 which may be in an outer shield 160 to form a coaxial cable. The shield 160 may be coupled to ground, to the cylinder 144 for grounding the driver electrode 148 and to the antenna ground plane 58.

In response to the element 152 being crushed, the piezoelectric effect, for example, develops a current in the output electrode 154 which flows through the lead 59 and through the substantially low impedance of the wideband antenna 56 to form a narrow and high power pulse. The element 152 when formed of quartz, has a +X orientation in the arrangement shown but the invention is not to be limited to a particular type of orientation. The quartz may be slightly compressed to determine the polarity and then mounted in the epoxy 158 with the + and − faces positioned as shown at the element 152. The +X orientation may be defined as that orientation in which the impact wave travels from the −X face to the +X face of the quartz crystal with the sign convention representing the electrical polarity of the specimen in compression. As is well known in the art, the dipole movement of the compressed atoms of the quartz provides the current generation along the X axis during compression. Thus, an explosively generated shock wave is passed through a flat faced cylinder 148 and into a positively oriented X-cut alpha quartz disk 152 of a relatively large diameter-to-thickness ratio which may be greater than 5. A one-dimensional strain thus exists in the quartz and fields resulting from the piezoelectric effect are one-dimensional. The piezoelectrically produced polarization in a state of one-dimensional strain is directly proportional to the applied stress so that compression to destruction develops a high power pulse.

The compression converters such as 48 are further described in a Sandia Corporation reprint SCR-416, June 1961, of "Electrical and Optical Effects of Shock Waves in Crystalline Quartz" by F. W. Neilson, W. B. Benedick, W. P. Brooks, R. A. Graham and G. W. Anderson, also available in the proceedings of the International College, Society of "Ondes De Detonation," Paris, France, August 28 to September 2, 1961. As described in this report, thin X-cut disks of hydrothermally grown synthetic quartz may be utilized, that is, disks with the large faces normal to the crystallographic X-direction. Because of the thin geometry, the mechanical and electrical edge effects were found to be negligible. The converter systems may also utilize an arrangement in which the stress is produced by the impact of flat-faced projectiles fired by a gun as described in the above report as well as in an article, "Technique For Studying Piezoelectricity Under Transient High Stress Conditions," by R. A. Graham in The Review of Scientific Instruments, vol. 32, No. 12, pages 1308–1313, December 1961. The pulse developed by this impact arrangement may be of a slightly longer time duration than in the compression arrangement shown in FIG. 2. The piezoelectric effect developed by the compression arrangement of FIG. 2 is also described in an article, "Dielectric Anomaly in Quartz for High Transient Stress and Field," by R. A. Graham, Journal of Applied Physics, vol. 33, No. 5, pages 1755–1758, May 1962.

Also in accordance with the principles of the invention, the high power pulse may be developed by compressing or crushing a ferroelectric material as the element 152. In this arrangement, the shock wave may be passed through an electroded element 152 of polarized ferroelectric ceramic such as barium titanate or lead zirconate-titantate. In response to the shock force, the element is rapidly depolarized to release the bound surface charge to flow into the output electrode 154. This mechanism depends on the lowering of the Curie temperature at high pressures and the increase of the Curie temperature with electric field in the direction of the initial polarization.

Figure 3:
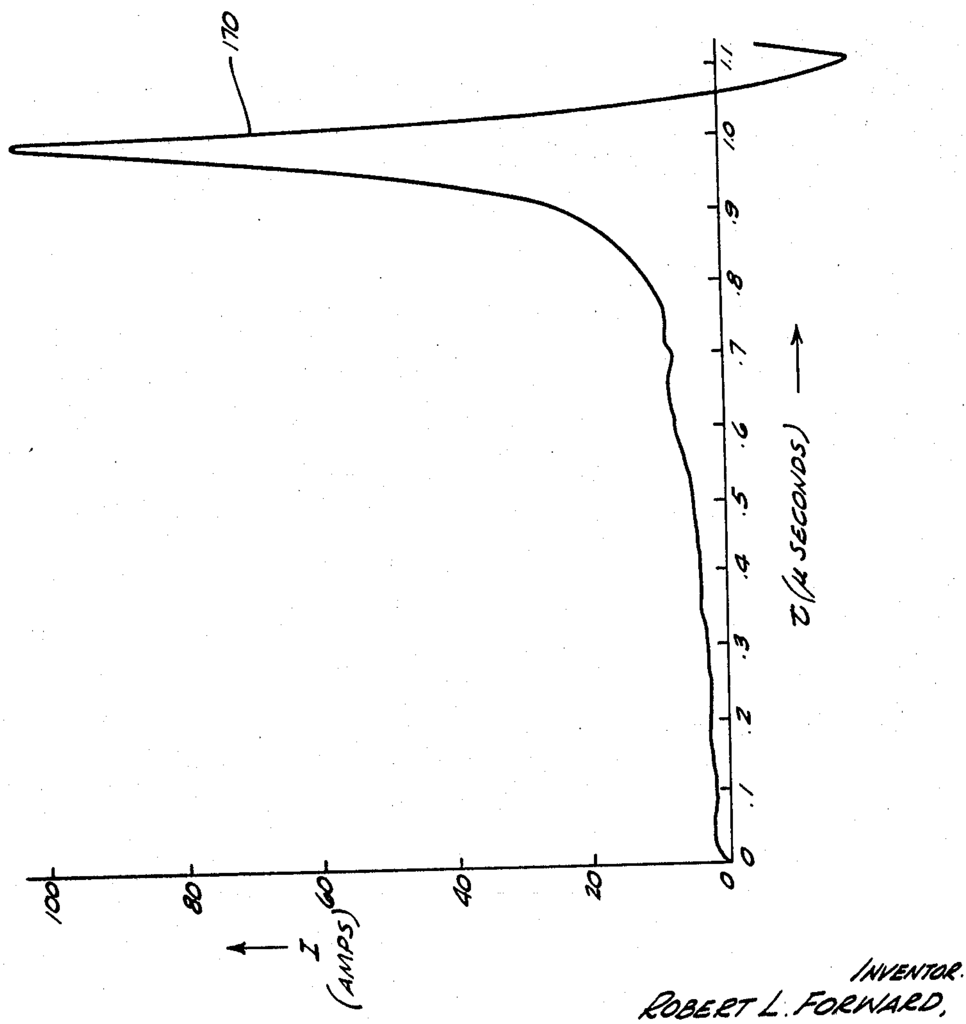
FIG. 3 is a graph of a current waveform as a function of time of the high power pulse developed by the piezoelectric or ferrite element of FIG. 2.

Referring now to FIG. 3, a current pulse 170 is shown as an example of the pulse that is developed by the converters 48, 58 and 60. The pulse may have a width of approximately 0.2 microsecond and be formed after a delay of approximately 0.8 microsecond. The pulse of the waveform 170 was developed utilizing a PBX explosive, a 0.249 thick aluminum driver electrode crushing a 1.248 inch diameter times 0.249 inch thick piece of quartz with a load of 110 ohms connected to the output electrode 154. The pulse of the waveform 170 has a power rating of 1.67 microcoulombs per square centimeter, a peak current of 103.2 amperes and a peak voltage of 11,352 volts. Thus, the narrow pulse of the waveform 179 allows a large number of clock pulses to be accurately counted between transmitted pulses with the clock selected to oscillate at a very high frequency. The wideband and frequency independent characteristics of the antennas 61 and 80 transmits sufficient harmonics without delays so that the very narrow pulse with a fast rise time is transmitted and received.

Referring now principally to FIG. 1, the operation of the system in accordance with the invention will be explained in further detail. The complement of the binary numbers to be transmitted are initially inserted into the counters 14 and 19 by manual control of the message source 22, for example. The transmitter 10 may, for example, be included in a first atmospheric or space vehicle which is utilized to transmit a relatively short message to other atmospheric or space vehicles each of which may include a receiver system similar to the receiver system 12. At a predetermined point in time, the timer circuit 38 may be energized by an internal clock mechanism to develop a first pulse of the waveform 40. It is to be noted that if the transmitter 10 is available to manual control, the timer 38 may be initially energized by a manual switch (not shown). The clock 24 as well as the clock 96 may be previously energized into operation so that clock pulses of the waveform 28 are being applied to the open gates 32 and 33. In response to the pulse of the waveform 40, the flip flop 41 is triggered to a state which may apply and maintain a positive signal at the gate 32 so that clock pulses which may have a frequency of 100 mc. (megacycles), for example, are applied to the counter 14. Thus the counter 14 starts a binary count from the number initially stored therein.

Also, in response to the pulse of the waveform 40, the converter 48 is fired and a high power and narrow pulse of the waveform 66 is applied to the antenna 56 and radiated into space substantially without a change or degradation of the amplitude versus time configuration. The receiving antenna 80 intercepts the transmitted energy and responds to develop the pulse of the waveform 86 which is amplified and applied to the control counter 90. As a result, the gate 104 is closed and clock pulses of the waveform 98 are applied to the counter 110 which has been previously reset to a zero state. The clock circuit 96 which may be crystal controlled has the same frequency of operation as the clock circuit 24 to a high degree of accuracy.

After the counter 14 counts to the 11111111 state during a time period representing the binary message, a negative pulse of the waveform 47 is developed by the flip flop 17 as the flip flop 17 representing the most significant digit of the number changes to "zero" state. The differentiating circuits 43 and 45 may include a suitable rectifying arrangement such as a diode biased so that only negative differentiated pulses are applied therefrom. A negative differentiated pulse of the waveform 50 is applied to the flip flop 56 to close the gate 33 and allows pulses of the waveform 28 to be applied to the counter 19 which is storing the complement of the second binary number to be transmitted. Although the clock pulses of the waveform 28 may continue to pass to the counter 14, they do not affect the system operation.

Also, in response to the negative pulse of the waveform 50, the converter 58 is fired and a high power and narrow pulse similar to that of the waveform 66 is radiated into space from the antenna 56. The antenna 80 intercepts the radiated pulse and develops a pulse similar to the pulse of the waveform 86 which is amplified and applied to the control counter 90. Thus the flip flops 94 and 92 are triggered to the 10 state and the gates 104 and 106 are respectively closed and opened. The first message is thus stored in the counter 110 which may be 10110010 as shown or the complement of the original number in the counter 14. It is to be noted that because the transmission time of the pulses of the waveform 66 is substantially the same for all pulses, the accuracy of the time between intercepted pulses is not substantially affected by the transmission time. The numerical message may be continually applied to the indicator 126 or may be manually or automatically transferred thereto. When the gate 106 is opened, the clock pulses of the waveform 98 are applied to the counter 112 which starts a binary count from the zero state. The counter 19 thus counts to its maximum capacity and the flip flop representing the most significant digit is triggered to a "zero" state to develop a pulse of the waveform 49. As a result, a negative differentiated pulse of the waveform 51 is applied to the lead 55 and will trigger other flip flop and gate arrangements (not shown) if more than two messages are to be transmitted. In response to the pulse of the waveform 51, the converter 60 is fired and a third high power and narrow pulse similar to the waveform 66 is radiated or transmitted from the antenna 61 into space. The antenna 80 responds to develop a pulse similar to that of the waveform 86 which is amplified and applied to the control counter 90. As the flip flops 94 and 92 change to the 11 states, the gates 104 and 106 are both closed and clock pulses of the waveform 98 are prevented from being applied to the counter 112. The binary number 11111010 which is the second transmitted message, is then stored in the counter 112 and is available to be transferred to the indicator 126. Thus, the system conveys one message for each transmitted pulse occurring after the initial pulse provided by the timer 38. It is to be noted that the system is not limited to the inserting of the complement of the message into the counters at the transmitter, but the message itself may be set therein with the complement of the message being developed in the counters at the receiver 12. The indicator 126 may also include conventional decoding circuits for indicating or utilizing various portions of the informational message.

The system in accordance with the invention will send messages, each of 26 bits or more, utilizing a clock circuit operating to develop clock pulses at a frequency of 100 mc. Because the accuracy of conventional quartz crystal oscillators is approximately one part in $10^{-8}$ for short periods of oscillation, the number of bits that may be included between any two pulses is approximately 26, $10^{-8}$ being approximately equal to $2^{26}$. At a high clock rate, the number of clock pulses that may be counted is substantially determined by the rise time and narrowness of the transmitted pulse. Thus, the pulse of the waveform 170 of FIG. 3 allows a large amount of binary information such as a binary number with 26 bits, for example, to be transmitted in a very short time, that is, with a large clock frequency such as 100 mc. It is to be noted that for transmitting 26 bits of information, the counters 14, 19, 110 and 112 each include 26 flip flops but for convenience of explanation have been illustrated as including 8 flip flops.

Because the system of the invention develops a half cycle of pulse energy of over a megawatt, with the source of power being light in weight, a very large power over weight ratio is provided by the transmitter. The high explosive utilized in the converter which may have an energy density of $10^3$ to $10^4$ Joules per cubic centimeter, provides a maximum amount of power with a minimum of weight. The wideband antenna system allows the system to operate without frequency conversion of the half cycle of RF energy.

Thus there has been described a transmitting system utlizing pulse position coding and explosive to pulse converter units to provide a light weight and high power system. The system allows a maximum amount of binary information to be tranmitted in a minimum of time, that is, each of the transmitted binary messages is formed of a large number of binary bits. For transmitting over long distances and from an aircraft or space vehicles, where weight is a factor, for example, the system of the invention is especially desirable.

What is claimed is:

1. A system comprising:
a source of coded trigger pulses having time intervals therebetween representative of binary information;
a plurality of explosive means responsive to the trigger pulses to develop pulses; and
decoding means responsive to the pulses developed by said plurality of explosive means to provide a representation of said binary information.

2. A communication system comprising:
a source of coded trigger pulses having time intervals therebetween representative of binary information;
a plurality of converter means each including an explosive element responsive to the trigger pulses, a movable element and an element responsive to the movable element to develop pulses; and
decoding means responsive to the time intervals between the pulses developed by said plurality of converter means to provide representation of the binary information.

3. A transmitting and receiving system comprising:
a first source of clock pulses;
first counting means responsive to said clock pulses to develop trigger pulses having coded time intervals therebetween;
a source of an initiating pulse;
a plurality of converters each having an explosive element responsive to a trigger pulse or said initiating pulse and having a pluse forming element responsive to said explosive element;
means for conveying the pulses formed by said pulse forming element;
a second source of clock pulses; and
second counting means coupled to said second source of clock pulses and to said means for conveying to respond to the conveyed pulses and decode the time intervals therebetween.

4. A communication system comprising:
a source of trigger pulses for developing trigger pulses at selected times with the periods therebetween representative of binary information;
a plurality of converter means each including an explosive element responsive to one of the trigger pulses of said source and a pulse forming element responsive to the explosive element to form pulses;
means for conveying said radio frequency pulses; and
a counter means determining the periods between the pulses and develop a representation of said binary information, said counter means being coupled to said means for conveying.

5. A binary information conveying system comprising: first and second converters each including an explosive element responsive to a trigger pulse, a movable electrode and a signal forming element compressible for developing a current pulse;

a source of trigger pulses coupled to said first and second converters, said trigger pulses having a time period therebetween representative of the binary information to be conveyed;

a first wideband antenna coupled to said first and second converters for transmiting pulses of energy in response to said current pulses;

a second wideband antenna for intercepting the transmitted pulses; and a counting means for counting the information period between the trigger pulses, said counting means being coupled to said second antenna.

6. A communication system comprising:

a first source of clock pulses;

a source of initiating pulses;

a first counting means;

a first gating means, said first gating means being coupled to said first source of clock pulses, to said first counting means and to said source of initiating pulses;

a first and second converter respectively coupled to said source of initiating pulses and to said first counting means, each including an explosive element responsive to an initiating pulse or to a predetermined count of said counter means and including a piezoelectric element responsive to said explosive means to develop a pulse;

a wideband transmission antenna for transmitting the pulses, said wideband transmission antenna being coupled to said first and said second converters;

a wideband receiving antenna responsive to the transmitted pulses;

a second source of clock pulses;

a second gating means coupled to said receiving antenna and to said second source of clock pulses; and a second counting means for counting the time interval between an initiating pulse and the predetermined count of said first counting means, said second counting means coupled to said second gating means.

7. A system for conveying binary information comprising:

a first and second source of clock pulses;

a source of initiating pulses;

a first gating means for passing clock pulses therethrough in response to an initiating pulse, said first gating means being coupled to said first source of clock pulses and to said source of initiating pulses;

a first binary counter coupled to said first gating means and responsive to the clock pulses to develop a signal at a predetermined count;

a first and a second converter being respectively coupled to said source of initiating pulses and to said first binary counter, each said first and second converter including an explosive element, a movable electrode and a piezoelectric element, the explosive element being responsive to an initiating pulse or the signal from said first binary counter to move the electrode and compress the piezoelectric element to develop a pulse;

a wideband transmitting antenna for transmitting the pulses, said wideband transmitting antenna being coupled to said first and said second converter;

a wideband receiving antenna responsive to the transmitted pulses;

a second gating means coupled to said receiving antenna and to said second source of clock pulses; and a second binary counter for counting the interval between pulses intercepted by said receiving antenna to provide a binary number representative of the binary information, said second binary counter being coupled to said second gating means.

8. A system for transmitting and receiving binary information comprising:

a first and a second source of clock pulses having substantially the same frequency;

a plurality of counters each set to a predetermined first counter number representative of binary information to be transmitted;

a plurality of gates coupled to said source of clock pulses and to said counters;

a source of timing pulses coupled to a first one of said plurality of gates;

a plurality of pulse forming means each coupled to a different one of said plurality of counters for forming a pulse in response to a predetermined second counter number, each of said gates except the first one thereof coupled to a different pulse forming means;

a plurality of converters, a first one of said plurality of converters being coupled to said source of timing pulses and each of the other converters being coupled to a different pulse forming circuit, each of said plurality of converters including; an explosive element responsive to the timing pulses of said source or to pulses developed by said pulse forming means, a movable element, and a piezoelectric element responsive to being compressed by said movable element for developing current pulse;

a first wideband antenna for responding to the current pulses to transmit pulses, said first wideband antenna being coupled to said plurality of converters;

a second wideband antenna for receiving the transmitted radio frequency pulses; and a plurality of counter means including said second source of clock pulses and coupled to said second antenna for counting the period between the received radio frequency pulses to develop binary numbers representative of the transmitted binary information.

9. A system for transmitting and receiving binary information comprising:

a first and a second source of clock pulses having substantially the same frequency;

a plurality of first counters;

a plurality of first gates coupled to said first source of clock pulses and to said plurality of first counters;

a source of timing pulses coupled to a first one of said plurality of first gates;

a plurality of pulse forming means for forming a pulse in response to a predetermined counter number, each of said first gates except said first one thereof coupled to a different pulse forming means, each of said plurality of pulse forming means being coupled to a different one of said plurality of first counters;

a plurality of converters, a first one of said plurality of converters being coupled to said source of timing pulses and each of the other said plurality of converters being coupled to a different pulse forming circuit, each of said plurality of converters including; an explosive element responsive to said timing pulses or to pulses developed by said pulse forming means, a movable element, and a piezoelectric element responsive to being compressed by said movable element for developing current pulse;

a first wideband antenna coupled to said plurality of converters for responding to the current pulses to transmit the current pulses from said plurality of converters;

a second wideband antenna for receiving the current pulses from said first wideband antenna;

a plurality of second gates each coupled to said second source of clock pulses and to said second antenna; and a plurality of second counters, each of said plurality of second counters being coupled to a different one of said plurality of second gates for counting the period between the received pulses to develop numbers representative of the transmitted binary information.

References Cited

UNITED STATES PATENTS

| | | | |
|---|---|---|---|
| 2,447,233 | 8/1948 | Chatterjea et al. | 179—15 |
| 2,610,583 | 9/1952 | Miller | 310—8.7 X |
| 2,970,545 | 2/1961 | Howe | 102—70.2 |
| 3,270,283 | 8/1966 | Ikrath et al. | 325—101 |

ROBERT L. GRIFFIN, *Primary Examiner.*

DAVID G. REDINBAUGH, *Examiner.*

J. T. STRATMAN, *Assistant Examiner.*